OSCILLATION REDUCER FOR EMITTER FOLLOWERS INCLUDING CLAMPING MEANS

Original Filed Sept. 22, 1961

INVENTOR.
DAVID A. CITRIN
BY Charles R. Lepchinsky
AGENT

United States Patent Office 3,270,289
Patented August 30, 1966

3,270,289

OSCILLATION REDUCER FOR EMITTER FOLLOWERS INCLUDING CLAMPING MEANS

David A. Citrin, Dalton, Mass., assignor to Burroughs Corporation, Detroit, Mich., a corporation of Michigan Continuation of application Ser. No. 140,074, Sept. 22, 1961. This application May 5, 1965, Ser. No. 457,244
9 Claims. (Cl. 330—29)

This application is a continuation of Serial No. 140,074, now abandoned, filed September 22, 1961, and assigned to a common assignee.

This invention relates to the prevent of oscillations and more particularly to the prevention of oscillations in a transistor emitter follower or a chain of transistor emitter follower circuits.

For certain applications of transistor logic circuits it is desirable that the logic circuits be capable of very rapid switching. High speed switching can be obtanied by utilizing transistor emitter followers in class A operation. The emitter follower may be used in a basic logic circuit along with other logical elements, such as diodes, to form a high-speed switching arrangement. However, under certain conditions, an input signal containing a D.C. level applied to an emitter follower, or a chain of emitter followers, causes the emitter follower to oscillate, thereby alleviating its usefulness as a logical element.

Accordingly, an object of this invention is the prevention of oscillations in an emitter follower circuit.

Another object of this invention is the prevention of oscillations in a chain of emitter follower circuits.

A further object of this invention is the prevention of oscillations in an emitter follower circuit, or a chain of emitter follower circuits, when an input signal containing both a positive and negative D.C. level is utilized.

A still further object of this invention is the improvement of transistor circuits.

These and other objects are accomplished in the present invention by utilizing a clamping transistor as part of the emitter follower circuit. In a short chain of emitter followers it is necessary only to utilize the clamping transistor in the last stage of the chain. In a long chain (6 or more) of emitter followers, the transistor clamp is utilized at the last stage and at as many intermediate stages as is necessary.

The clamping transistor is coupled to the emitter follower in such a manner that the emitter resistor of the emitter follower is the collector resistor for the clamping transistor. The emitter electrode of the clamping transistor is returned to a source of potential and the base electrode of the clamping transistor is coupled to the source of input signals applied to the emitter follower. Since the clamping transistor is the same conductivity type as the emitter follower transistor, this arrangement biases the clamping transistor so that it is normally nonconducting. The operation of the circuit is such that when an input pulse containing oscillations from a preceding emitter follower, or when an input signal containing a D.C. level is applied to the emitter follower, the input signal is also seen on the base of the clamping transistor. The magnitude of the input signal is sufficient to cause the clamping transistor to conduct in the sautration region, but not of sufficient magnitude to cause the emitter follower transistor to enter saturation. Because the collector of the clamping transistor is connected to the emitter resistor of the emitter follower, the voltage seen at the emitter resistor (which is also the output voltage) is substantially equal to the emitter supply voltage of the clamping transistor. This is so because the clamping transistor represents very little impedance when it is operating in the saturation region during the presence of an input signal. Therefore, the effect of the clamping transistor is to clamp the output voltage during the presence of an input signal which prevents any oscillations that might occur on the output signal.

A more detailed description follows in conjunction with the following drawings in which.

Figure 1:
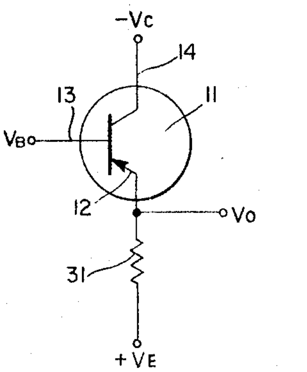
Fig. 1 PRIOR ART
FIGURE 1 is a schematic diagram of a basic emitter follower circuit which is well known in the art.

Referring now to the drawings, wherein like reference characters designate like or corresponding parts throughout the several figures, there is shown in FIGURE 1 an emitter follower circuit comprising a PNP transistor 11 having an emitter 12, a base 13, and a collector 14 electrode. The collector 14 is returned directly to a source of negative potential $V_C$, the base 13 is connected to a source of biasing potential $V_B$, and the emitter 12 is connected to a source of positive potential $V_E$ through load resistor 31. The input signal is applied to the base 13. The output signal $V_O$ is obtained from the emitter 12 electrode.

The emitter follower shown in FIGURE 1 receives its name from its vacuum-tube counterpart, the cathode follower. The emitter follower provides power gain and has no phase inversion. In addition, it affects only a slight attenuation of the input signal as well as a slight change in the D.C. level from input to output.

For high speed operation of the emitter follower, the minority carrier storage of the transistor 11 must be reduced to a minimum. This is accomplished by making the collector 14 voltage supply $V_C$ approximately $-1$ to $-1.5$ volts more negative than the most negative excursion of the input signal. If the PNP transistor is replaced with a NPN transistor, all the voltages would need to be reversed and $V_C$ would be $+1$ to $+1.5$ volts more positive than the most positive excursion of the input signal to minimize minority carrier storage. This magnitude of collector supply voltage $V_C$ will enable the transistor to remain in the action region (class A operation) when an input signal is applied to the base 13, thus preventing the collector 14 from becoming biased in the forward direction. This reverse bias on collector 14 will also tend to reduce the collector capacitance because the collector capacitance is inversely proportional to the collector voltage.

The feedback in the emitter follower circuit shown in FIGURE 1 is normally of a degenerative nature. If the base 13 current changes by a given amount, the change in emitter 12 current is proportional and produces a feedback voltage on the emitter 12. Because the emitter voltage follows the base voltage, the feedback voltage on the emitter produces a feedback current in the base in the opposite direction to that of the signal current, i.e., 180° out of phase with the signal current, and thus represents negative feedback.

In the emitter follower circuit, and especially in a chain of emitter follower circuits, it can be considered that there is an inductance (not shown) in series with the base element 13 and a capacitance (not shown) shunted across the emitter follower resistor 31. The inductance is present because of any inductive effect in the lead wires and any actual inductance used in the circuit. The capacitance effect is due to the stray capacitance in the circuit plus any physical capacitance actually in the circuit.

Because of this inductance in series with the base and the capacitance in parallel with the emitter resistor 31, the normally degenerative feedback can become regenerative and cause the circuit to oscillate. The change from degenerative to regenerative feedback can be understood from phase shift considerations. If the input signal applied to the base of transistor 11 is sinusoidal, the emitter current will lag the base current by an amount $\phi_1$ because of transistor delay. The capacitance (not shown) in parallel with the emitter resistor 31 will cause the feedback voltage seen at the emitter to lag the emitter current by an amount $\phi_2$. There will be another phase lag $\phi_3$ between the feedback current in the base and the feedback voltage on the emitter because of the series inductance (not shown) in the base circuit. The resulting feedback current will then be $-(180+\phi_1+\phi_2+\phi_3)$ degrees out of phase with the input signal base current. For certain frequencies the sum of $\phi_1+\phi_2+\phi_3$ will be 180° causing the feedback current to be in phase with the input signal base current thereby giving the emitter follower a tendency to oscillate.

Figure 3:
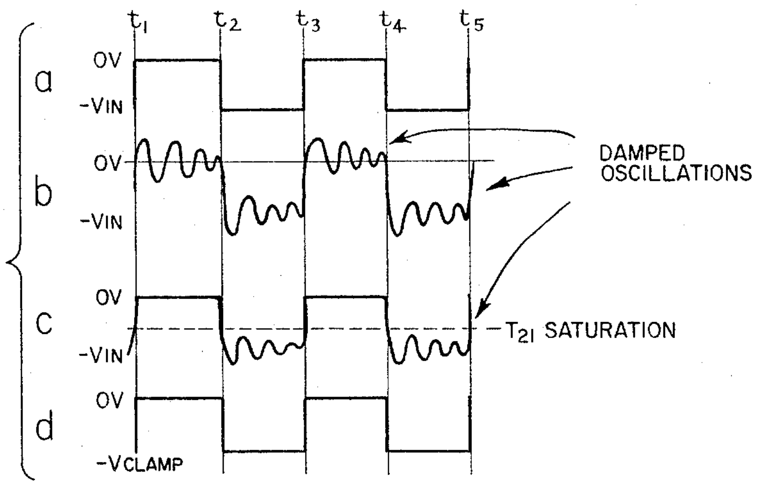
FIGURE 3 shows ideal input and output waveshapes for the circuits shown by FIGURES 1, 2 and 4.

FIGURE 3*a* shows an input signal comprising a series of negative going square waves. Investigations have shown that when an input signal such as that shown in FIGURE 3*a* is applied to the base 13 of the transistor shown in FIGURE 1, the output $V_O$ signal of the emitter follower circuit oscillates at the negative and positive D.C. levels as is shown by FIGURE 3*b*. These oscillations are caused by the actual and stray reactive components in the circuit discussed above. Investigations have also shown that when the emitter followers are cascaded, the gain is greater than unity which causes the oscillations to be amplified, thereby aggravating the problem of the oscillations.

Figure 2:
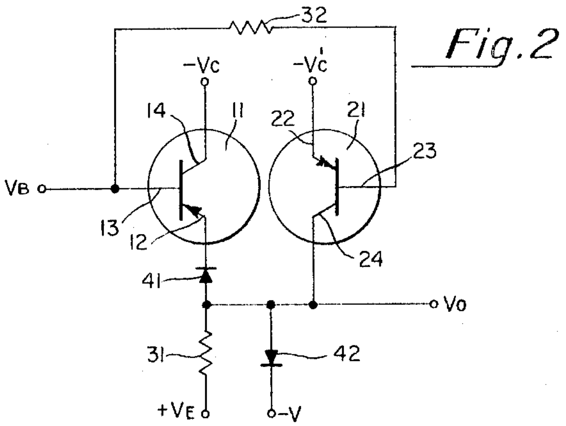
FIGURE 2 is a schematic diagram of an emitter follower circuit containing a preferred embodiment of the present invention.

FIGURE 2 shows an emitter follower circuit containing a preferred embodiment of the present invention which prevents the oscillations at both the positive and negative D.C. level of the output signal. Reference to FIGURE 2 will show that a diode 41 has been serially connected between the emitter 12 electrode and the emitter resistor 31 and a second diode 42 has been connected between the output $V_O$ and a negative source of potential V. Although this supply is indicated as −V, it is understood that a ground or zero volt reference may be used. The diodes 41 and 42 function to prevent oscillations from occurring when a relatively positive D.C. level is applied to the emitter follower such as between times $t_1$ to $t_2$ and $t_3$ to $t_4$ of an input signal as shown by FIGURE 3*a*. This action of the diodes 41 and 42 is the subject of a U.S. patent application by R. Mekel, Serial No. 120,562, filed June 29, 1961, now Patent No. 3,152,265, and assigned to the same assignee as this application. However, Mekel does not disclose how to prevent oscillations on the relatively negative D.C. portion of the input signal. FIGURE 2 also shows a PNP clamping transistor 21 having its collector 24 electrode connected to the emitter resistor 31 of the emitter follower transistor 11. The emitter 22 of the clamping transistor 21 is connected to a source of negative potential $V_C1$ and the base 23 is connected to the base 13 of transistor 11 through resistor 32. The clamping transistor 21 functions to prevent oscillations from occurring when a relatively negative D.C. level is applied to the emitter follower such as between times $t_2$ to $t_3$ and $t_4$ to $t_5$ of an input signal as shown by FIGURE 3*a*.

The operation of the circuit is such that when an input signal containing both positive and negative D.C. portions, such as that shown by FIGURE 3*a*, is applied to the emitter follower, no oscillations are seen on the output signal. The output signal of the circuit shown in FIGURE 2 is shown by FIGURE 3*d* for an input corresponding to that shown by FIGURE 3*a*.

Consider now the circuit shown in FIGURE 2 when the input signal shown by FIGURE 3*a* is applied to the base 13 of transistor 11. During the time $t_1$ to $t_2$, the base 13 of the PNP transistor 11 will be at zero or ground potential. Since the collector 14 electrode is returned to a source of negative potential $V_C$, and since the emitter 12 electrode is returned to a source of positive potential $V_E$, the base 13 potential is negative with respect to the emitter 12 which forwardly biases the transistor 11 causing it to conduct. The diode 41 in series with the emitter resistor 31 causes a positive level shift in the output signal due to the slight voltage drop across the diode 41. That is, the emitter 12 potential follows the input potential seen on the base 13 which is at ground potential and therefore the emitter 12 potential is also substantially at ground potential. Because the output signal $V_O$ is taken between the diode 41 and the emitter resistor 31, the output voltage level is slightly positive with respect to the emitter 12 by an amount equal to the voltage drop across the diode 41.

This positive shift in voltage level forwardly biases diode 42, which has its anode terminal connected to the output $V_O$ and its cathode potential connected to a source of negative potential V, causing it to conduct. The conduction of diode 42 standardizes the output $V_O$ level by clamping the output potential to a value equal to the sum of the potential V, to which the cathode of diode 42 is connected, and the voltage drop across diode 42. The clamping action of diode 42 damps out any oscillations that tend to occur due to stray and actual reactive components being in the circuit. As mentioned above, this prevention of oscillations by the diodes 41 and 42 is the subject of U.S. application Serial No. 120,562, filed June 27, 1961, by R. Mekel. The Mekel disclosure teaches only how to prevent the oscillations when a positive D.C. level is present in the input signal and does not teach how to prevent the oscillations when both a positive and negative D.C. level are present in the input signal to an emitter follower, as does the instant invention.

During the time $t_1$ to $t_2$, the signal seen at the base 13 of the transistor 11 is also seen at the base 23 of the clamping transistor 21 due to their being coupled together by way of resistor 32. When a single stage emitter follower is used as shown in FIGURE 2, the diodes 41 and 42 prevent oscillations from occurring and the potential seen on the base 23 of the clamping transistor 21 is substantially the same as is seen on the base 13 of the emitter follower transistor 11 and is substantially ground potential as shown by FIGURE 3*a*. A substantially ground potential on the base 23 of the PNP clamping transistor 21 will not forwardly bias the transistor 21 because the emitter electrode 22 is returned to a source of negative potential $V_C1$. In order to forwardly bias the clamping transistor 21, the potential seen at the base 23 would have to be more negative than the negative emitter potential $V_C1$. Since the potential at the base 23 of the clamping transistor 21 is at substantially ground potential, the clamping transfer transistor 21 is non-conducting from time $t_1$ to $t_2$.

When a chain of emitter followers is used, the clamping transistor 21 is used only in the last stage or at as many intermediate stages as is necessary. Therefore, the input signal to the emitter follower having a clamping transistor 21 in a chain of emitter followers is that shown by FIGURE 3*c*. Reference to FIGURE 3*c* will show that the oscillations do not occur on the positive D.C. portions and the potential of the input signal is substantially at ground potential between time $t_1$ to $t_2$, therefore transistor 21 will not conduct. This is due to the fact that all of the emitter followers in a chain of emitter followers contain the diodes 41 and 42 which prevent oscillations when a positive D.C. potential is applied to the emitter follower. Oscillations, however, do occur on the negative D.C. portion of the input signal. These oscillations are present because the emitter followers preceding the transistor 21 do not have any means of preventing such oscillations.

During the time $t_2$ to $t_3$ and $t_4$ to $t_5$, the input signal is a negative going square wave as shown by FIGURE 3*a* if a single stage emitter follower is used and a negative pulse containing damped oscillations, as shown by FIGURE 3*c*, if the emitter follower is preceded by another emitter follower circuit not having a clamping transistor 21. In either case the operation of the emitter follower circuit with the clamping transistor 21 is the same.

The negative going signal on the base 13 of transistor 11 increases the forward bias of transistor 11 causing it to conduct more heavily, which tends to drive the junction of the diode 41 and emitter resistor 31 negative with respect to diode 42 source V. At the same time the negative input signal is also seen at the base 23 of transistor 21 by way of resistor 32. The circuit parameters are chosen such that the input signal is more negative than the negative source of potential $V_C1$ to which the emitter electrode 22 is connected. Therefore, the negative input signal on the base 23 forwardly biases the transistor 21 causing it to conduct. The input signal has sufficient magnitude to cause the transistor 21 to operate in the saturation region. Since the transistor operates in its saturation region, it presents very little impedance and effectively clamps the output potential $V_O$ to the emitter potential $V_C1$ illustrated as $V_{CLAMP}$. The clamping action of transistor 21 damps out any oscillations that tend to occur due to stray and actual reactive components being in the circuit or due to oscillations being on the input signal. The output signal is shown by FIGURE 3*d* to be free of any oscillations and clamped at both its positive and negative excursions.

When the input signal contains oscillations on the negative pulse (as shown by FIGURE 3*c*) due to preceding emitter follower stages not having a clamping transistor 21, it is necessary for the clamping action of the transistor 21 that the oscillations never have sufficient magnitude to take the transistor 21 out of the saturation region. This is shown in FIGURE 3*c* by the saturation potential of transistor 21 being less than the least negative excursion of the oscillations on the input signal. In a chain of emitter followers the magnitude of these oscillations is controlled by utilizing the clamping transistor 21 at the last stage of the chain and at as many intermediate stages as necessary to keep the magnitude of the oscillations from unclamped stages within the desired limits. In some cases it may be desirable that every emitter follower in the chain contain the clamping transistor 21.

Investigations have shown that for minimum noise at the negative excursion of the output signal, the alpha cut-off frequency of the clamping transistor 21 should be greater than, or equal to, three times the original ring frequency.

The coupling resistor 32 should be large enough to prevent loading of the input, yet permit sufficient base drive to operate the clamping transistor 21.

If it is desirable to use positive input pulses in place of negative input pulses, it is necessary only to replace the PNP transistors 11 and 21 with NPN transistors, reverse the diodes 41 and 42, and reverse the polarities of all of the potential sources.

Figure 4:
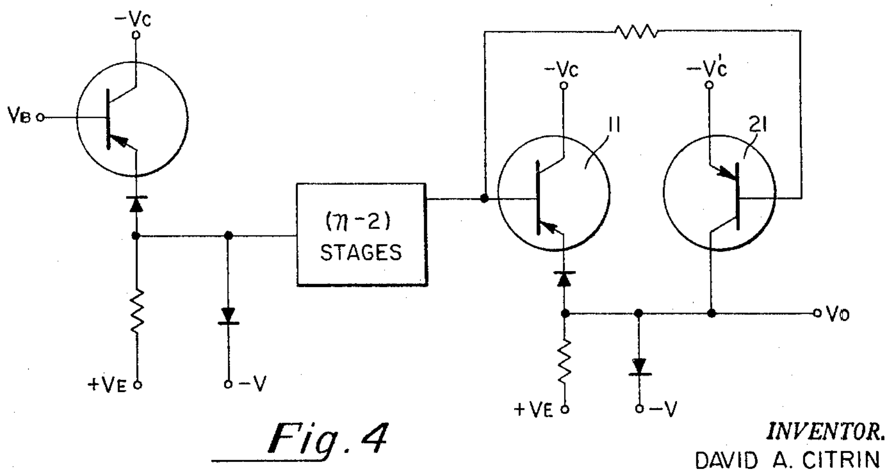
FIGURE 4 is a schematic diagram showing a preferred embodiment of the present invention used in a chain of emitter followers.

FIGURE 4 shows a chain of emitter follower circuits where the last stage contains the clamping transistor 21. As discussed previously, the clamping transistor 21 may be incorporated with as many intermediate stages as is necessary.

It is to be understood that the circuit shown is for purposes of illustration only and that variations may be made thereto without departing from the spirit and scope of the invention as defined by the appended claims. As an example, it is understood that the relatively positive level of the signal may be clamped to eliminate oscillations in any other appropriate manner than that illustrated.

What is claimed is:

1. In an emitter follower of the class wherein the collector electrode of a transistor is directly connected to a reference potential, the base electrode is coupled to a source of input signals, the emitter electrode is coupled through a load impedance to a source of potential and an output terminal is connected to said emitter electrode, an oscillation reducing network comprising a semiconductor device having at least two current electrodes and a control electrode, one of said current electrodes being directly connected to said output terminal, a source of potential connected to the other of said current electrodes, and circuit means connecting said control electrode of said semiconductor device to said base electrode of said emitter follower transistor for causing said semiconductor device to conduct at saturation in response to a predetermined signal from said source of input signals.

2. In an emitter follower as recited in claim 1, said circuit means comprising a resistor whose value is sufficiently large to prevent undue loading upon said source of input signals and said source of input signals providing two distinct levels of input voltage both of which are sufficient to cause conduction of said transistor but neither of which is sufficient to cause said transistor to conduct at saturation.

3. In combination, at least one semiconductor device having two current electrodes and a control electrode, means connecting one of said current electrodes to a reference potential and the other of said current electrodes to an output terminal, a load impedance connected from said output terminal to a source of potential, an input terminal connected to said control electrode for receiving input signals, a signal clamping means comprising a further semiconductor means with two current terminals and a control terminal, a source of potential connected to one of said current terminals and means connecting the other current terminal to said output terminal, means connecting said control terminal of said further semiconductor means to said input terminal for causing said further semiconductor means to conduct at saturation in response to a predetermined level of said input signals, said semiconductor device and said further semiconductor means both being of a conductivity type which tends to increase their current conductivity in response to said predetermined level of said input signals.

4. The combination as recited in claim 3 wherein said at least one semiconductor device comprises a plurality of transistors of a first conductivity type connected in emitter follower configuration with each control electrode being connected to the output terminal of a preceding transistor and wherein said further semiconductor means is a transistor of said same first conductivity type connected as a clamp to one of said emitter follower transistors to limit oscillations caused by rapidly changing voltage levels of said input signals.

5. An electrical circuit comprising a first semiconductor device having at least a base electrode, an emitter electrode and another electrode, a second semiconductor device of like conductivity having at least a base electrode, a collector electrode and another electrode, a load impedance, voltage level shifting means connected between said emitter of said first semiconductor device and one end of said load impedance, a first potential source coupled to the other end of said load impedance, a source of input signals coupled to said base of said first semiconductor device, output means coupled to the junction of said level shifting means and said load impedance, a second potential source, a unidirectional current device coupled between said output means and said second potential source, said collector electrode of said second semiconductor device also coupled to said output means, an impedance element coupled between said base of said first semiconductor device and said base of said second semiconductor device and potential means coupled to said other electrodes of said first and second semiconductor devices.

6. In an emitter follower of the class wherein the collector electrode of a transistor is directly connected to a potential source, the base electrode is coupled to a source of input signals, the emitter electrode is coupled through voltage level shifting means and a load impedance to a source of potential, and a unidirectional current device is coupled between a source of potential and the output which is obtained at the junction of the voltage level shifting means and load impedance, an oscillation reducing network comprising a semiconductor device having at least two current electrodes and a control electrode, one of said current electrodes being coupled to said junction of said voltage level shifting means with said load impedance, a source of potential coupled to the other said current electrode, and means coupling said control electrode of said semiconductor device to said base electrode of said emitter follower transistor for enabling them to conduct substantially simultaneously.

7. The combination defined in claim 6 wherein said semiconductor device is a second transistor and the two current electrodes and the control electrode are respectively the collector electrode, the emitter electrode and the base electrode of said second transistor.

8. An emitter follower circuit comprising a first and second transistor each having an emitter, a base, and a collector electrode, a diode having an anode and a cathode, a first source of potential coupled to said collector electrode of said first transistor, a source of signals coupled to said base electrode of said first transistor, a load impedance, voltage level shifting means connected between said emitter electrode of said first transistor and one end of said load impedance, a second source of potential coupled to the other end of said load impedance, output means coupled to the junction of said voltage level shifting means with said load impedance, said anode of said diode coupled to said output means, a third source of potential coupled to said cathode of said diode, said collector of said second transistor also being coupled to said output means, a fourth source of potential coupled to said emitter of said second transistor, a coupling impedance connected between said base of said second transistor and said base of said first transistor by enabling said transistors to conduct simultaneously.

9. The combination comprising: first current-valve means having an input terminal and an output terminal, for providing an output voltage on said output terminal when receiving an input voltage on said input terminal; and second current-valve means which saturates at a lower value of input voltage than that required to saturate said first current-valve means, having a first electrode electrically connected to said input terminal, having a second electrode electrically connected to said output terminal, and having a third electrode electrically connected to a reference potential, for providing a low resistance between said second and third electrodes when receiving said input voltage on said first electrode and for providing a high resistance between said second and third electrodes when receiving no such said input voltage on said first electrode; whereby said output voltage is clamped to a value substantially equal to said reference potential on said third electrode when said input voltage is applied to said input terminal and causes said first and second current-valve means to conduct.

References Cited by the Examiner

UNITED STATES PATENTS

| | | | |
|---|---|---|---|
| 2,873,387 | 2/1959 | Kidd. | |
| 3,053,997 | 9/1962 | Cobbold | 330—32 X |
| 3,089,964 | 5/1963 | Bruce et al. | |
| 3,152,265 | 10/1964 | Mekel | 307—88.5 |
| 3,155,963 | 11/1964 | Boensel. | |

ROY LAKE, *Primary Examiner.*

F. D. PARIS, *Assistant Examiner.*